United States Patent
Kim et al.

(10) Patent No.: US 6,940,924 B1
(45) Date of Patent: Sep. 6, 2005

(54) SIGNAL DETECTION BASED ON CHANNEL ESTIMATION

(75) Inventors: Helen H. Kim, Holmdel, NJ (US); Meng-Lin Yu, Morganville, NJ (US)

(73) Assignee: Agere Systems Inc., Allentown, PA (US)

( * ) Notice: Subject to any disclaimer, the term of this patent is extended or adjusted under 35 U.S.C. 154(b) by 683 days.

(21) Appl. No.: 09/639,259

(22) Filed: Aug. 15, 2000

(51) Int. Cl.[7] .......................... H03H 7/40; H04L 27/06; H04L 1/00
(52) U.S. Cl. ........................ 375/340; 375/232; 375/346
(58) Field of Search ................................ 375/232, 233, 375/234, 235, 236, 259, 260, 261, 262, 263, 375/264, 265, 267, 268, 269, 270, 271, 272, 375/273, 274, 275, 276, 277, 278, 279, 280, 375/281, 282, 283, 284, 285, 340, 346, 348, 375/144, 148

(56) References Cited

U.S. PATENT DOCUMENTS

| | | | | |
|---|---|---|---|---|
| 3,715,691 A | * | 2/1973 | Kurth | 333/18 |
| 4,213,095 A | | 7/1980 | Falconer | 375/14 |
| 5,191,462 A | | 3/1993 | Gitlin et al. | 359/189 |
| 5,604,724 A | * | 2/1997 | Shiokawa | 369/124 |
| 6,061,395 A | * | 5/2000 | Tonami | 375/232 |
| 6,192,072 B1 | * | 2/2001 | Azadet et al. | 375/233 |
| 6,654,431 B1 | * | 11/2003 | Barton et al. | 375/346 |
| 6,725,411 B1 | * | 4/2004 | Gerlach et al. | 714/755 |

* cited by examiner

Primary Examiner—Temesghen Ghebretsinae
Assistant Examiner—Sam K. Ahn

(57) ABSTRACT

A receiver for a received signal having two or more different data levels comprises two or more channel estimators, (at least) one channel estimator for each different data level, where each channel estimator preferably implements an adaptive $2^{nd}$ order or higher model of the transmission channel over which the received signals was transmitted to generate an estimated signal for one of the different data levels. The receiver also has a comparator that compares the current received signal to the estimated signals generated by the different channel estimators to select an output data value for the current received signal. The adaptive model of the transmission channel has coefficients that are dynamically controlled based on an error signal generated by the comparator. Each channel estimator relies on an output signal generated by an adaptive equalizer. In preferred shared-component implementations, each adaptive equalizer is shared by two or more different channel estimators, and, in one possible preferred shared-component implementation, all of the different channel estimators share a single adaptive equalizer.

30 Claims, 3 Drawing Sheets

SIGNAL DETECTION BASED ON CHANNEL ESTIMATION

BACKGROUND OF THE INVENTION

1. Field of the Invention

The present invention relates to signal processing, and, in particular, to the processing of noisy received signals, such as high-speed optical signals distorted by linear and non-linear polarization mode dispersion (PMD) effects during transmission through an optical transmission path and resulting in data pulse broadening and inter-symbol interference (ISI).

2. Description of the Related Art

As transmission speed increases in optical fiber communications, polarization mode dispersion (PMD) becomes a significant factor limiting system performance, especially for transmission speeds of 10 Gb/s or higher. PMD causes data pulse broadening and creates inter-symbol interference (ISI). Unlike chromatic dispersion which can usually be countered by using a short dispersion-compensated fiber, PMD is time varying. While optical solutions have been proposed to counter PMD, they are usually very expensive and require a feedback path from the receiver back to the transmitter.

Traditionally, electronic adaptive equalizers have been used to mitigate received signal distortion resulting in ISI. Well-known techniques for channels having linear distortion include linear feedforward equalization and linear decision feedback equalization (DFE).

FIG. 1 shows a conventional equalizer 100 used to correct linear signal distortion. Equalizer 100 has two adaptive equalizers: adaptive equalizer 102 configured to provide feedforward equalization and adaptive equalizer 104 configured to provide decision feedback equalization. In particular, adaptive equalizer 102 receives the current received signal $v_{in}$ and generates a linearly equalized signal $v_{in}'$. This equalized signal $v_{in}'$ is presented to subtraction node 106, which subtracts the feedback signal generated by adaptive equalizer 104. The resulting difference signal is presented to slicer 108, which decides whether the current received signal $v_{in}$ corresponds to a "1" or a "0" by comparing the difference signal to a fixed threshold between 0 and 1 (e.g., half way between the reference voltages for logic "1" and logic "0" inside the slicer). The selected output data level is fed back to adaptive equalizer 104. In addition, the error signal (i.e., the difference between the difference signal generated at subtraction node 106 and the sliced signal level generated by slicer 108) is fed back to both adaptive equalizers 102 and 104 and used to dynamically control the coefficients within those equalizers using some conventional technique such as a least mean square (LMS) algorithm. Further information about typical implementations of adaptive equalizers 102 and 104 can be found in E. A. Lee and D. G. Messerschmitt, *Digital Communication*, Kluwer Academic Publisher, 1988, and S. U. H. Qureshi, "Adaptive Equalization," Proceedings of the IEEE, Vol. 73, No. 9, September 1985, the teachings of both of which are incorporated herein by reference.

When the channel is non-linear, such as an optical fiber channel dominated by PMD effects, non-linear equalization is used, since the effectiveness of equalizers, such as that shown in FIG. 1, is limited in those cases. Non-linear equalization techniques range from extremely complex solutions, such as those described in U.S. Pat. No. 4,213,095, to simple single-tap non-linear DFE modules, such as those described in U.S. Pat. No. 5,191,462.

In general, effective non-linear equalization is a very complex and difficult process, involving the inversion of the non-linear channel response such that the combined channel and non-linear equalizer frequency response is flat. The optimization cost functions are often not smooth convex functions and, as a result, considerable adaptation convergence difficulties exist. These difficulties are manifested by the complexity of the techniques described in U.S. Pat. No. 4,213,095.

SUMMARY OF THE INVENTION

The present invention is directed to a receiver that relies on channel estimation to mitigate inter-symbol interference (ISI) problems, especially when the channel is non-linear. When channel non-linearity is predominantly quadratic, a channel estimation-based receiver of the present invention performs extremely well with much lower complexity than traditional non-linear equalization techniques. The adaptive electronic solution of the present invention provides a versatile and cost-effective technique for correcting polarization mode dispersion (PMD) problems in optical transmission systems. One possible application of the present invention is to mitigate fiber PMD in high-speed SONET systems, such as OC 192, especially where second-order PMD, also known as polarization-induced chromatic dispersion (PCD), is strong.

In one embodiment, the present invention is a receiver for a received signal having two or more data levels, the received signal having been transmitted over a transmission channel, the receiver comprising (a) two or more channel estimators, at least one channel estimator for each different data level for the received signal, each channel estimator being configured to model the transmission channel to generate an estimated signal corresponding to one of the data levels; and (b) a comparator configured to (1) receive the received signal and the estimated signal from each channel estimator and (2) select an output data level for the received signal.

In another embodiment, the present invention is a method for processing a received signal having two or more data levels, the received signal having been transmitted over a transmission channel, the method comprising the steps of (a) generating at least one estimated signal for each data level based on a model of the transmission channel; and (b) processing the received signal and the estimated signal for each data level to select an output data level for the received signal.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 2:
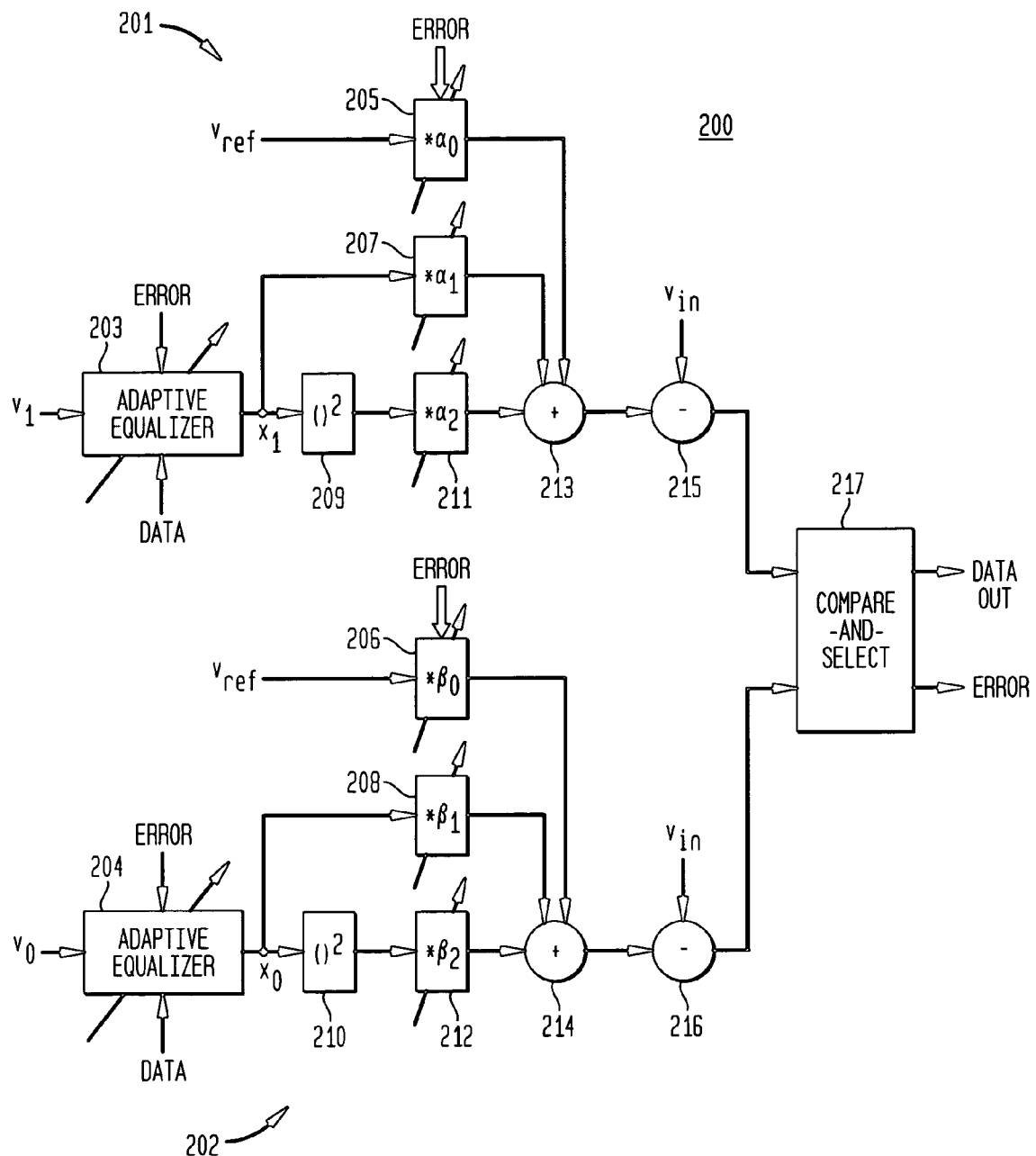
FIG. 2 shows a block diagram of a channel estimation-based receiver, according to one embodiment of the present invention, in which the received signal has two possible levels.

FIG. 2 shows a channel estimation-based receiver 200, according to one embodiment of the present invention. According to this embodiment, receiver 200 is designed to correct non-linear distortion for a received signal Vin having two different data levels corresponding to logic "1" and logic "0". Receiver 200 has two quadratic (i.e., $2^{nd}$ order, non-linear) channel estimators: channel estimator 201 for level "1" and channel estimator 202 for level "0", where each channel estimator adaptively generates an estimate for one of the two data levels for the current received signal $v_{in}$.

The two estimated signals are present to a comparator comprising two subtraction nodes 215 and 216 and a compare-and-select module 217. In particular, each estimated signal is subtracted from the current received signal $v_{in}$ at one of the subtraction nodes and the two resulting difference signals are compared at compare-and-select module 217, which decides whether the current received signal corresponds to a level "1" or a level "0" (e.g., based on which difference signal has the smallest absolute value).

Figure 1:
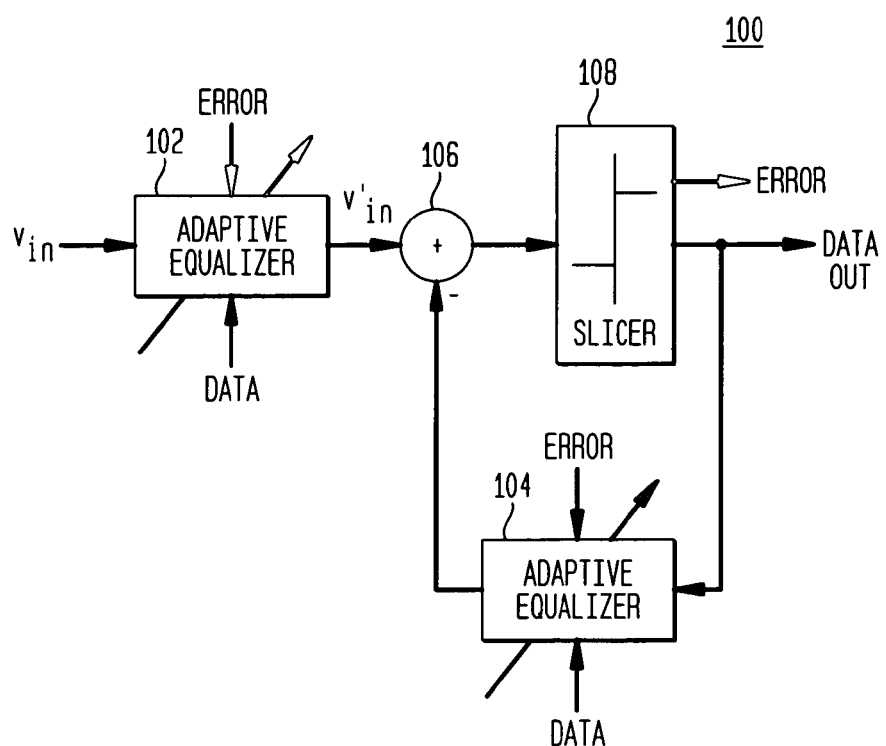
FIG. 1 shows a conventional equalizer used to correct linear signal distortion.

Level "1" channel estimator 201 of receiver 200 comprises an adaptive equalizer 203 configured to receive a fixed reference signal $v_1$ corresponding to an ideal current level "1" signal. In addition, adaptive equalizer 203 receives feedback signals from compare-and-select module 217 corresponding to both the previous data output signal(s) as well as the previous error signal(s), where the error signal is used to dynamically control the coefficients within adaptive equalizer 203, e.g., using a conventional LMS control technique. Adaptive equalizer 203 is preferably implemented based on conventional adaptive equalizer designs similar to that used for adaptive equalizer 104 of FIG. 1, since, in adaptive equalizer 203, the tap data are sliced symbols.

Adaptive equalizers are typically implemented as finite impulse response (FIR) taps in hardware, which consists of multipliers, accumulators, and storage devices to implement equations like $(a_k * coeff(1) + a_{-1} * coeff(2) + \ldots)$, where $a_k$ and $a_{k-1}$ are current and previous inputs. For typical feedforward equalizers, where inputs represent either analog or digital input voltages, the required resolution is high. For feedback equalizers, inputs are sliced symbols (e.g., 0 or 1 in 2-level cases). Since only 1-bit resolution is needed, the multiplier design can be significantly simplified.

The output signal $x_1$ from adaptive equalizer 203 is processed in parallel through two processing paths within channel estimator 201: a $1^{st}$ order path and a $2^{nd}$ order path. The $1^{st}$ order path multiplies the output signal $x_1$ by a $1^{st}$ order coefficient $\alpha_1$ at multiplication node 207, while the $2^{nd}$ order path squares the output signal $x_1$ at squaring node 209 and multiplies the resulting squared signal $x_1^2$ by a $2^{nd}$ order coefficient $\alpha_2$ at multiplication node 211. Channel estimator 201 also has a $0^{th}$ order path, which multiplies a fixed reference signal $v_{ref}$ by a $0^{th}$ order coefficient $\alpha_0$ at multiplication node 205. The outputs from all three multiplication nodes are summed at summation node 213 to generate an estimated level "1" signal $v_1^{est}$ corresponding to Equation (1) as follows:

$$v_1^{est} = \alpha_0 + \alpha_1 x_1 + \alpha_2 x_1^2 \quad (1)$$

The estimated level "1" signal ($v_1^{est}$) is then subtracted from the current received signal $v_{in}$ at subtraction node 215 to generate the difference signal for level "1" channel estimator 201 that is input to compare-and-select module 217.

According to the present invention, each of multiplication nodes 205, 207, and 211 are dynamically controlled by the error signal generated by compare-and-select module 217 such that the coefficients $\alpha_0$, $\alpha_1$, and $\alpha_2$ are all adaptive coefficients that are dynamically adjusted, e.g., using an LMS control technique. (Note that, in FIG. 2, the thick arrow is used to signify that the error signal is input to each of multiplication nodes 205, 207, and 211.) In preferred implementations, the $1^{st}$ order coefficient $\alpha_1$ has a fixed value of 1. As such, the $1^{st}$ order path can be implemented simply as a signal path connecting the output of adaptive equalizer 203 directly to the corresponding input of summation node 213 without requiring multiplication node 207.

Level "0" channel estimator 202 is analogous to level "1" channel estimator 201, with elements 204, 206, 208, 210, 212, and 214 of level "0" channel estimator 202 configured to operate in analogous fashion to elements 203, 205, 207, 209, 211, and 213 of level "1" channel estimator 201, to generate the estimated level "0" signal, which is subtracted from the current received signal $v_{in}$ at subtraction node 216 to generate the difference signal for level "0" channel estimator 202 that is input to compare-and-select module 217. Note that the input to level "0" channel estimator 202 is a fixed, level "0" reference signal $v_0$, which is different from the fixed, level "1" reference signal $v_1$. The resulting estimated level "0" signal generated by channel estimator 202 can be represented by $$v_0^{est} = \beta_0 + \beta_1 x_0 + \beta_2 x_0^2 \quad (2)$$

where $x_0$ is the output signal from adaptive equalizer 204 and $\beta_0$, $\beta_1$, and $\beta_2$ are the adaptive $0^{th}$, $1^{st}$, and $2^{nd}$ order coefficients applied at multiplication nodes 206, 208, and 212, respectively, and dynamically controlled based on the error signal generated by compare-and-select module 217.

By including the $2^{nd}$ order terms ($\alpha_2 x_1^2$ and $\beta_2 x_0^2$), channel estimators 201 and 202 model a general $2^{nd}$ order system. If the transmission channel for received signal $v_{in}$ is dominated by $1^{st}$ and $2^{nd}$ order effects, then channel estimators 201 and 202 should produce accurate replicas of the two possible channel outputs after they have been properly adapted to model the channel. The present invention avoids the typically difficult problem associated with conventional non-linear equalization schemes of having to invert the channel response.

Figure 3:
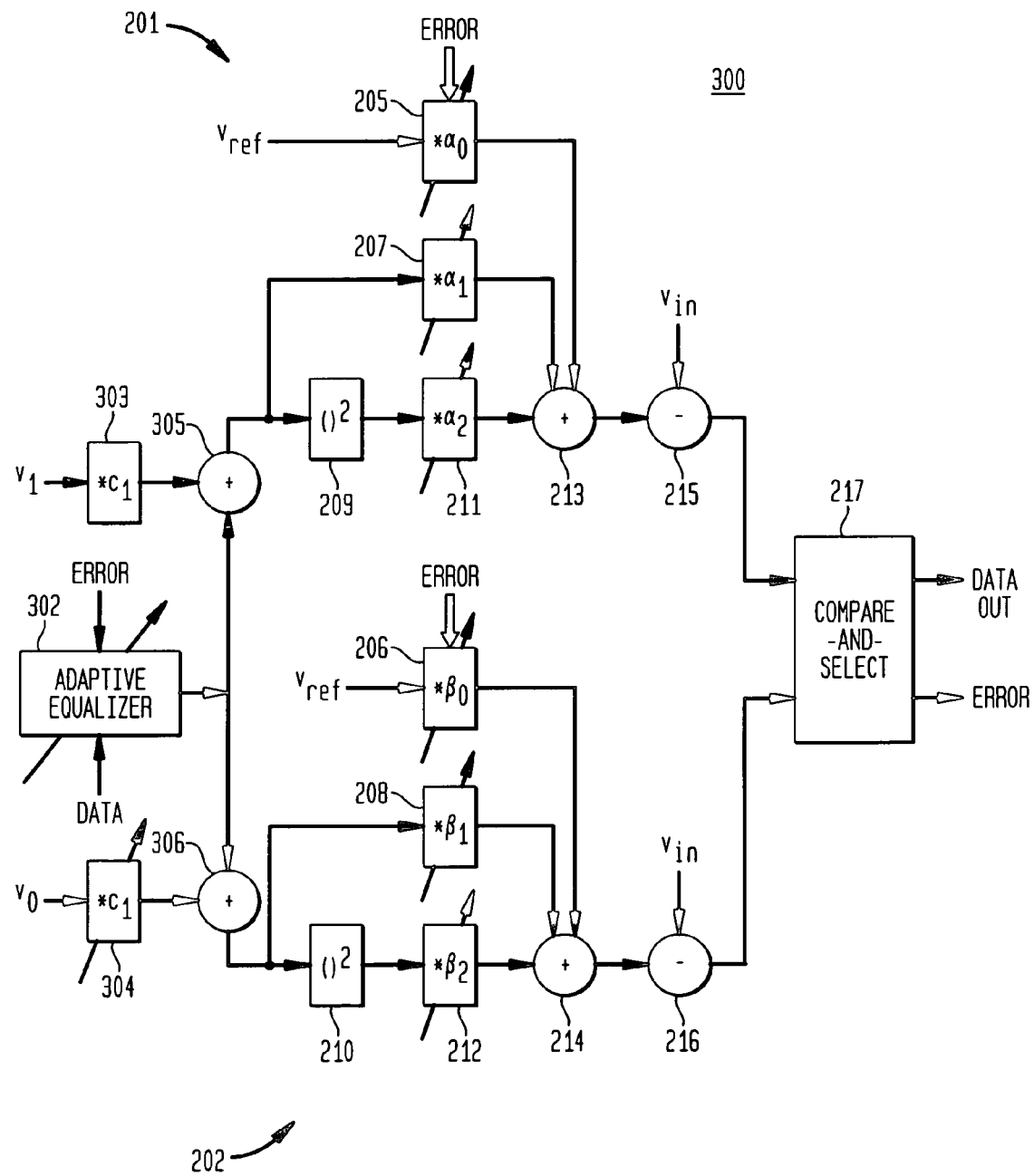
FIG. 3 shows a block diagram corresponding to a shared-component implementation of the channel estimation-based receiver of FIG. 2.

FIG. 3 shows a block diagram corresponding to a preferred shared-component implementation of the channel estimation-based receiver 200 of FIG. 2. According to this shared-component implementation, receiver 300 is implemented with only a single adaptive equalizer 302, which differs from adaptive equalizers 203 and 204 (e.g., the first tap corresponding to the current received signal is stripped). The output signal from adaptive equalizer 302 is used to generate the input signals for both channel estimators 201 and 202.

In particular, the level "1" reference signal $v_1$ is multiplied by a coefficient $c_1$ (e.g., corresponding to the first tap of a conventional adaptive equalizer) at multiplication node 303 and the resulting product ($v_1 * c_1$) is added to the output signal from adaptive equalizer 302 at summation node 305 to generate the input signal to channel estimator 201. Analogously, the level "0" reference signal $v_0$ is multiplied by the coefficient $c_1$ at multiplication node 304 and the resulting product ($v_0 * c_1$) is added to the output signal from adaptive equalizer 302 at summation node 306 to generate the input signal to channel estimator 202.

Although the two channel estimators (e.g., 201 and 202 of FIGS. 2 and 3) are shown with different sets of coefficients ($\alpha_0$, $\alpha_1$, $\alpha_2$) and ($\beta_0$, $\beta_1$, $\beta_2$), in some implementations, the different channel estimators could be implemented using a single set of coefficients. In that case, the potential exists for even further sharing of components, where two or more channel estimators temporally share the same set of $0^{th}$, $1^{st}$, and $2^{nd}$ order path components, with different inputs being applied at different times corresponding to different channel estimators. Such temporal sharing would add latency to and decrease the speed (i.e., data throughput) of the receiver, which could make such an implementation unacceptable for certain applications. Another way of sharing is to share the LMS update circuit for the coefficients and just copy the updated results for the two channel estimators.

Channel estimation-based receivers 200 and 300 may be implemented in software or in hardware, in either the digital domain or the analog domain, or in combinations thereof. For high-speed applications (i.e., data rates as high as 10 Gb/s or even higher), the receivers are preferably implemented in hardware in the analog domain.

Channel estimation-based receivers 200 and 300 are designed with the following characteristics:

The received signal $v_{in}$ has only two data levels ("1" and "0");

The channel estimators contain only $0^{th}$, $1^{st}$, and $2^{nd}$ order terms; and Only the current and past data signals are fed into the adaptive equalizer(s).

Those skilled in the art will appreciate that the present invention can be implemented for applications having other characteristics.

For example, channel estimation-based receivers of the present invention can be implemented for applications in which the received signal has more than two data levels. In that case, the receiver is implemented with more than two channel estimators: (at least) one channel estimator for each different data level, where the estimated signal generated by each channel estimator is subtracted from the current received signal to generate a difference signal for the compare-and-select module, which still preferably selects the output data level for the current received signal based on the difference signal having the smallest absolute value.

Furthermore, channel estimation-based receivers of the present invention can be implemented for applications in which the channel estimators contain one or more additional, higher-order terms beyond the $2^{nd}$ order term. In that case, each channel estimator will have an additional processing path for each additional, higher-order term comprising, for example, a sequence of multiplication nodes to generate the higher-order term, where one of the multiplication nodes is an adaptive node corresponding to a dynamically controlled coefficient for the higher-order term.

Moreover, channel estimation-based receivers of the present invention can be implemented for applications in which each adaptive equalizer receives future data as well as the past and current data as tap inputs. In that case, the receiver should be implemented with a different channel estimator for each different combination of current and future data. For example, for a receiver designed for a received signal having two data levels "1" and "0" where the adaptive equalizers take into account the current data value and one future data value, the receiver will preferably have four different channel estimators: one for each different combination of possible current and future data values (i.e., 00, 01, 10, and 11). If the adaptive equalizers are configured to take into account two future data values, then the receiver will preferably have eight different channel estimators corresponding to the eight different combinations of one current and two future data values.

These different characteristics can be combined such that, in general, a channel estimation-based receiver according to the present invention will preferably have $m^{n+1}$ channel estimators: one channel estimator for each different possible combination of the current data value and n future data values, where each data value has m different possible levels, where m is an integer greater than 1 and n is a non-negative integer, and each channel estimator has p+1 processing paths corresponding to $(0^{th}, 1^{st}, 2^{nd}, \ldots p^{th})$ order terms, where p is an integer greater than 1. In preferred shared-component implementations, different channel estimators will share adaptive equalizers. In one possible shared-component implementation, all $m^{n+1}$ channel estimators will share a single adaptive equalizer with suitable components provided to generate the appropriate input signal for each different channel estimator from the single output signal generated by the shared adaptive equalizer.

Although the present invention has been described in the context of processing electrical signals corresponding to optical signals transmitted over optical fiber transmission channels, the present invention can also be applied to signals received from other types of transmission channels, including electrical or wireless (i.e., "over-the-air") transmission channels.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A receiver for a received signal having two or more data levels, the received signal having been transmitted over a transmission channel, the receiver comprising:

(a) two or more channel estimators, at least one channel estimator for each different data level for the received signal, each channel estimator being configured to model the transmission channel to generate an estimated signal corresponding to one of the data levels; and (b) a comparator configured to (1) receive the received signal and the estimated signal from each channel estimator and (2) select an output data level for the received signal, wherein:
    each channel estimator implements a $2^{nd}$ order or higher model of the transmission channel; and
    the model is an adaptive model of the transmission channel that is dynamically controlled based on an error signal generated by the comparator.

2. The receiver of claim 1, wherein each channel estimator comprises a processing path for each order term in the model of the transmission channel.

3. The receiver of claim 2, wherein at least one of the processing paths in each channel estimator comprises a multiplication node having an adaptive coefficient that is dynamically controlled based on an error signal generated by the comparator.

4. The receiver of claim 3, wherein a processing path in each channel estimator corresponding to a $1^{st}$ order term of the model with a coefficient having a value of 1, wherein the $1^{st}$ order term processing path is implemented without a multiplication node.

5. The receiver of claim 1, further comprising one or more adaptive equalizers, each adaptive equalizer configured to receive an ideal data level signal corresponding to one of the data levels and to generate an input signal for one or more of the channel estimators.

6. The receiver of claim 5, wherein at least one adaptive equalizer is shared by two or more of the channel estimators.

7. The receiver of claim 6, wherein all of the channel estimators share a single adaptive equalizer.

8. The receiver of claim 5, wherein each adaptive equalizer is further configured to receive one or more future data levels and the receiver comprises a channel estimator for each different combination of current and future data levels.

9. The receiver of claim 5, wherein tap data for each adaptive equalizer corresponds to sliced symbols corresponding to two or more of the data levels.

10. The receiver of claim 5, wherein each channel estimator receives a different input signal from the one or more adaptive equalizers.

11. The receiver of claim 1, wherein the comparator comprises:
    (a) a subtraction node for each channel estimator configured to generate a difference signal between the received signal and the corresponding estimated signal; and
    (b) a compare-and-select module configured to receive the difference signals from the subtraction nodes and to select the output data level for the received signal based on a difference signal having a smallest absolute value.

12. The receiver of claim 1, wherein:
    the transmission channel is an optical transmission channel; and
    the two or more channel estimators and the comparator are implemented in a single integrated circuit as analog circuitry.

13. The receiver of claim 1, wherein the model of the transmission channel includes at least one of a $0^{th}$ order term and a $1^{st}$ order term.

14. The receiver of claim 13, wherein each channel estimator comprises a processing path for each order term in the model of the transmission channel.

15. A method for processing a received signal having two or more data levels, the received signal having been transmitted over a transmission channel, the method comprising the steps of:
    (a) generating at least one estimated signal for each data level based on a model of the transmission channel; and
    (b) processing the received signal and the estimated signal for each data level to select an output data level for the received signal, wherein:
        step (a) comprises the step of implementing a $2^{nd}$ order or higher model of the transmission channel; and
        the model is an adaptive model of the transmission channel that is dynamically controlled based on an error signal generated during step (b).

16. The method of claim 15, further comprising the steps of:
    (c) generating a difference signal between the received signal and the corresponding estimated signal; and
    (d) selecting the output data level for the received signal based on a difference signal having a smallest absolute value.

17. A receiver for a received signal having two or more data levels, the received signal having been transmitted over a transmission channel, the receiver comprising:
    (a) an adaptive equalizer, a corresponding channel estimator, and a corresponding subtraction node for each data level; and
    (b) a compare-and-select module, wherein:
        each adaptive equalizer is configured to receive an ideal data level signal for the corresponding data level and to generate an input signal for the corresponding channel estimator;
        each channel estimator is configured to model the transmission channel to generate an estimated signal corresponding to said each data level, each channel estimator implementing a $2^{nd}$ order or higher model of the transmission channel, wherein:
            the model has at least a $0^{th}$ order term, a $1^{st}$ order term, and a $2^{nd}$ order term; and
            said each channel estimator comprises a processing path for each order term in the model;
        each subtraction node is configured to generate a difference signal between the received signal and the corresponding estimated signal; and
        the compare-and-select module configured to receive the difference signals from the subtraction nodes and to select the output data level for the received signal based on a difference signal having a smallest absolute value.

18. A receiver for a received signal having two or more data levels, the received signal having been transmitted over a transmission channel, the receiver comprising:
    (a) an adaptive equalizer;
    (b) a set of ideal-data-level circuitry, a corresponding channel estimator, and a corresponding subtraction node for each data level; and
    (c) a compare-and-select module, wherein:
        the adaptive equalizer is configured to generate a single adapted equalizer signal for each set of ideal-data-level circuitry;
        each set of ideal-data-level circuitry is configured to receive an ideal signal data level for the corresponding data level and to generate an input signal for the corresponding channel estimator;
        each channel estimator is configured to model the transmission channel to generate an estimated signal corresponding to said each data level, each channel estimator implementing a $2^{nd}$ order or higher model of the transmission channel, wherein:

the model has at least a $0^{th}$ order term, a $1^{st}$ order term, and a $2^{nd}$ order term; and said each channel estimator comprises a processing path for each order term in the model;

each subtraction node is configured to generate a difference signal between the received signal and the corresponding estimated signal; and the compare-and-select module configured to receive the difference signals from the subtraction nodes and to select the output data level for the received signal based on a difference signal having a smallest absolute value.

19. A receiver for a received signal having two or more data levels, the received signal having been transmitted over a transmission channel, the receiver comprising:

(a) two or more channel estimators, at least one channel estimator for each different data level for the received signal, each channel estimator being configured to model the transmission channel to generate an estimated signal corresponding to one of the data levels; and (b) a comparator configured to (1) receive the received signal and the estimated signal from each channel estimator and (2) select an output data level for the received signal, wherein:

each channel estimator implements a $2^{nd}$ order or higher model of the transmission channel;

each channel estimator comprises a processing path for each order term in the model of the transmission channel; and at least one of the processing paths in each channel estimator comprises a multiplication node having an adaptive coefficient that is dynamically controlled based on an error signal generated by the comparator.

20. The receiver of claim 19, wherein a processing path in each channel estimator corresponding to a $1^{st}$ order term of the model with a coefficient having a value of 1, wherein the $1^{st}$ order term processing path is implemented without a multiplication node.

21. A receiver for a received signal having two or more data levels, the received signal having been transmitted over a transmission channel, the receiver comprising:

(a) two or more channel estimators, at least one channel estimator for each different data level for the received signal, each channel estimator being configured to model the transmission channel to generate an estimated signal corresponding to one of the data levels;

(b) a comparator configured to (1) receive the received signal and the estimated signal from each channel estimator and (2) select an output data level for the received signal; and (c) one or more adaptive equalizers, each adaptive equalizer configured to receive an ideal 9 data level signal corresponding to one of the data levels and to generate an input signal for one or more of the channel estimators.

22. The receiver of claim 21, wherein at least one adaptive equalizer is shared by two or more of the channel estimators.

23. The receiver of claim 22, wherein all of the channel estimators share a single adaptive equalizer.

24. The receiver of claim 21, wherein each adaptive equalizer is further configured to receive one or more future data levels and the receiver comprises a channel estimator for each different combination of current and future data levels.

25. The receiver of claim 21, wherein tap data for each adaptive equalizer corresponds to sliced symbols corresponding to two or more of the data levels.

26. The receiver of claim 21, wherein each channel estimator receives a different input signal from the one or more adaptive equalizers.

27. A receiver for a received signal having two or more data levels, the received signal having been transmitted over a transmission channel, the receiver comprising:

(a) two or more channel estimators, at least one channel estimator for each different data level for the received signal, each channel estimator being configured to model the transmission channel to generate an estimated signal corresponding to one of the data levels; and (b) a comparator configured to (1) receive the received signal and the estimated signal from each channel estimator and (2) select an output data level for the received signal, wherein the comparator comprises:

(i) a subtraction node for each channel estimator configured to generate a difference signal between the received signal and the corresponding estimated signal; and (ii) a compare-and-select module configured to receive the difference signals from the subtraction nodes and to select the output data level for the received signal based on a difference signals having a smallest absolute value.

28. A receiver for a received signal having two or more data levels, the received signal having been transmitted over a transmission channel, the receiver comprising:

(a) two or more channel estimators, at least one channel estimator for each different data level for the received signal, each channel estimator being configured to model the transmission channel to generate an estimated signal corresponding to one of the data levels; and (b) a comparator configured to (1) receive the received signal and the estimated signal from each channel estimator and (2) select an output data level for the received signal, wherein:

each channel estimator implements a $2^{nd}$ order or higher model of the transmission channel; and the model of the transmission channel includes at least one of a $0^{th}$ order term and a $1^{st}$ order term.

29. The receiver of claim 28, wherein each channel estimator comprises a processing path for each order term in the model of the transmission channel.

30. A method for processing a received signal having two or more data levels, the received signal having been transmitted over a transmission channel, the method comprising the steps of:

(a) generating at least one estimated signal for each data level based on a model of the transmission channel;

(b) processing the received signal and the estimated signal for each data level to select an output data level for the received signal;

(c) generating a difference signal between the received signal and the corresponding estimated signal; and (d) selecting the output data level for the received signal based on a difference signal having a smallest absolute value.

* * * * *